United States Patent
Lu et al.

(10) Patent No.: US 10,439,204 B2
(45) Date of Patent: Oct. 8, 2019

(54) ELECTRODE ACTIVE COATING FOR A LITHIUM-ION BATTERY AND METHOD OF PRODUCTION THEREFORE

(71) Applicant: Innventia AB, Stockholm (SE)

(72) Inventors: Huiran Lu, Solna (SE); Simon Leijonmarck, Hagersten (SE); Ann Cornell, Lidingo (SE); Marten Behm, Stockholm (SE); Goran Lindbergh, Vallentuna (SE); Jiebing Li, Bandhagen (SE); Per Tomani, Huddinge (SE); Fernando Alvarado, Stockholm (SE)

(73) Assignee: Rise Innventia AB, Stockholm (SE)

( * ) Notice: Subject to any disclaimer, the term of this patent is extended or adjusted under 35 U.S.C. 154(b) by 104 days.

(21) Appl. No.: 15/555,404

(22) PCT Filed: Mar. 1, 2016

(86) PCT No.: PCT/SE2016/050160
§ 371 (c)(1),
(2) Date: Sep. 1, 2017

(87) PCT Pub. No.: WO2016/144232
PCT Pub. Date: Sep. 15, 2016

(65) Prior Publication Data
US 2018/0069232 A1    Mar. 8, 2018

(30) Foreign Application Priority Data

Mar. 6, 2015   (SE) ........................................ 1550272

(51) Int. Cl.
*H01M 4/04*    (2006.01)
*H01M 4/131*   (2010.01)
(Continued)

(52) U.S. Cl.
CPC ............ *H01M 4/1397* (2013.01); *C07G 1/00* (2013.01); *C08H 6/00* (2013.01); *C09D 197/005* (2013.01);
(Continued)

(58) Field of Classification Search
CPC .... H01M 4/0404; H01M 4/131; H01M 4/134; H01M 4/136; H01M 4/1391;
(Continued)

(56) References Cited

U.S. PATENT DOCUMENTS

2011/0256449 A1   10/2011  Mao
2011/0274612 A1   11/2011  Wohlmann et al.
(Continued)

FOREIGN PATENT DOCUMENTS

CA   2631141 A1   11/2009
CN   1179437 C    12/2004
(Continued)

OTHER PUBLICATIONS

Extended European Search Report of Patent Application No. 16762052. 5—5 pages (dated Oct. 16, 2018).
(Continued)

*Primary Examiner* — Brittany L Raymond
(74) *Attorney, Agent, or Firm* — Knobbe Martens Olson and Bear, LLP (57) ABSTRACT

A method for producing an electrode active coating on a current collector comprising providing isolated lignin and subjecting the isolated lignin to a pre-treatment in order to remove low molecular mass fractions of the lignin. The pre-treated lignin is mixed with an electrode active material, water and a conductive additive material so as obtain a slurry adapted for coating of a current collector. The coating obtained by the method comprises pre-treated lignin as a binder. The coating obtained has good binding properties
(Continued)

between the particles of the coating as well as to the current collector. Furthermore, it has excellent electrochemical properties during use in a lithium-ion battery.

22 Claims, 9 Drawing Sheets

(51) Int. Cl.
*H01M 4/134* (2010.01)
*H01M 4/136* (2010.01)
*H01M 4/1391* (2010.01)
*H01M 4/1395* (2010.01)
*H01M 4/1397* (2010.01)
*H01M 4/62* (2006.01)
*C07G 1/00* (2011.01)
*C08H 7/00* (2011.01)
*C09D 197/00* (2006.01)
*H01M 10/0525* (2010.01)

(52) U.S. Cl.
CPC ......... *H01M 4/0404* (2013.01); *H01M 4/131* (2013.01); *H01M 4/134* (2013.01); *H01M 4/136* (2013.01); *H01M 4/1391* (2013.01); *H01M 4/1395* (2013.01); *H01M 4/622* (2013.01); *H01M 10/0525* (2013.01)

(58) Field of Classification Search
CPC .. H01M 4/1395; H01M 4/1397; H01M 4/622; H01M 10/0525; C07G 1/00; C08H 6/00; C09D 197/005
See application file for complete search history.

(56) References Cited

U.S. PATENT DOCUMENTS

| | | | |
|---|---|---|---|
| 2012/0225199 A1* | 9/2012 | Muthu | H01M 4/131 427/126.4 |
| 2014/0038034 A1 | 2/2014 | Rios et al. | |
| 2014/0275498 A1* | 9/2014 | Littorin | D21C 11/0007 530/500 |
| 2014/0287315 A1 | 9/2014 | Troegel et al. | |
| 2015/0183813 A1* | 7/2015 | Eskelinen | C08H 6/00 530/507 |

FOREIGN PATENT DOCUMENTS

| | | |
|---|---|---|
| CN | 102361071 A | 2/2012 |
| FR | 3007582 A1 | 12/2014 |
| JP | 2006-202607 A | 8/2006 |
| JP | 2007-173210 A | 7/2007 |
| JP | 2013-203783 A | 10/2013 |
| WO | 2006/031175 A1 | 3/2006 |
| WO | 2014/046826 A1 | 3/2014 |
| WO | 2014035498 A1 | 3/2014 |

OTHER PUBLICATIONS

Jin et al., "Lignin-based electrospun carbon nanofibrous webs as free-standing and binder-free electrodes for sodium ion batteries", Journal of Power Sources, vol. 272—8 pages (2014).
Nirmale et al., "A review on cellulose and lignin based binders and electrodes: Small steps towards a sustainable lithium ion battery", International Journal of Biological Macromolecules, vol. 103—12 pages (2017).
International Search Report dated Jun. 21, 2016 in PCT Patent Application No. PCT/SE2016/050160 which is the parent application—4 pages.
Written Opinion dated Jun. 21, 2016 in PCT Patent Application No. PCT/SE2016/050160 which is the parent application—4 pages.
Novelty Search Report of the Swedish Patent and Registration Office (PRV) dated Sep. 22, 2014—9 pages.
Gnedenkov et al., Hydrolysis Lignin: Electrochemical Properties of the Organic Cathode Material for Primary Lithium Battery, Journal of Industrial and Engineering Chemistry, 2013, vol. 20, pp. 903-910.

* cited by examiner

ELECTRODE ACTIVE COATING FOR A LITHIUM-ION BATTERY AND METHOD OF PRODUCTION THEREFORE

CROSS-REFERENCE TO RELATED APPLICATIONS

This application is the U.S. National Phase under 35 U.S.C. § 371 of International Application PCT/SE2016/050160, filed Mar. 1, 2016, which claims priority to SE 1550272-7 filed Mar. 6, 2015.

TECHNICAL FIELD

The present disclosure relates in general to the field of lithium-ion batteries, in particular rechargeable lithium-ion batteries. More specifically, it relates to an electrode active coating and a method of producing an electrode active coating on a current collector for a lithium-ion battery.

BACKGROUND

A lithium-ion battery (also called Li-ion battery or LIB) is a rechargeable battery in which lithium ions travel from the negative electrode to the positive electrode during discharge, and in the opposite direction during charge. Lithium-ion batteries have attracted considerable attention due to their high energy density, high efficiency, no-memory effect, comparatively low weight, long life and environmentally friendly operation. They are today widely used for example for portable electronics, as well as in various types of electrical or hybrid vehicles.

Lithium-ion batteries are in general composed of a positive electrode, a negative electrode, an electrolyte and optionally a separator. For the electrodes, electrode active material(s) and conductive additive, such as carbon, are "glued" together by a binder and provided as a coating on a current collector. The electrode active materials for the positive electrode are lithium storage compounds, such as lithium cobalt oxide ($LiCoO_2$), lithium iron phosphate (LFP) or a lithium containing spinel such as lithium manganese oxide (LMO). Olivine $LiFePO_4$ has attracted more and more interest due to its advantages in terms of reasonably high theoretical capacity (170 mAh/g), flat voltage plateau 3.5 V vs. Li, relatively low cost, high safety and long cycling life. The electrode active material of the negative electrode may for example be graphite and/or a lithium storage compound.

The conductive additive material is usually carbon or carbon-based, and often in the form of carbon black, graphite or carbon fibers.

The conventional binder material for electrodes in commercial Li-ion batteries is polyvinylidene fluoride (PVDF), which has strong binding strength with current collectors as well as the electrode active material. However, all fluorinated polymers can easily deteriorate cycling performance of the batteries because of the formation of stable LiF and double bond (C=CF—) after reacting with Li metal and lithiated graphite ($Li_xC_6$). In addition, the arising heat generation using PVDF as binder could cause self-heating thermal runaway, which increases the safety issue. Furthermore, PVDF needs to be dissolved in organic solvent, typically N-methyl-2-pyrrolidinone (NMP), to produce a slurry to be used for the coating process of the current collector. During the subsequent drying procedure, NMP, which is expensive, toxic and harmful to both humans and environment, evaporates into the air.

Therefore, efforts have been made to develop alternative binders that are non-fluorinated, less costly and more environmental friendly. Recently, much effort has focused on using aqueous binders instead of non-aqueous binders for electrodes for Li-ion batteries, which could meet the requirements above. Water-based binders, such as styrene-butadiene-rubber (SBR), sodium-carboxyl-methyl-cellulose (CMC), poly(acrylamide-co-diallyldimethylammonium) (AMAC), and elastomer, have been evaluated as low cost green binder materials for electrodes of Li-ion batteries and show similar bonding ability and high flexibility. However, CMC, an extremely stiff and brittle polymer, suffers from inferior mechanical properties for optimized electrodes. Furthermore, SBR often suffers from inferior flexibility and cycle life, and may also have less than ideal adhesion.

US 2012/0225199 A1 discloses a coating for a current collector for a rechargeable electro-chemical cell comprising an electrode active material, a conductive additive material and a water-soluble polymeric binder. A large number of various water-soluble polymeric binders are proposed, including for example poly vinyl alcohols, polyvinyl pyrrolidone, polyethylene oxides, as well as starch, cellulose, protein, polysaccharide, dextrans, tannin and lignin.

It has also previously been proposed to use lignin-based composites to prepare carbon based materials for lithium-ion batteries or to use lignin-based carbon fibers as free-standing anode material.

CN 102361071 A1 discloses a method for preparing a lithium ion battery anode material. Lignin salt made of lignin ammonium sulfonate, sodium lignosulfonate, calcium lignosulfonate or lignin sulfonic acid magnesium is used as carbon source precursor of the anode material.

SUMMARY

The object to achieve is an electrode of a lithium-ion battery which may be produced at low cost, which is more environmentally friendly than previously known electrodes comprising PVDF, and which shows good electrochemical performance.

The object is achieved by means of a method of producing an electrode active coating on a current collector for a lithium-ion battery according to claim 1 and a coating according to claim 12.

It has been found that lignin can be used as a binder for electrode active materials in the electrode active coating of a current collector of Li-ion batteries instead of PVDF. Lignin has the advantages of being low cost, abundant and renewable in nature. Lignin may for example be obtained as a by-product from the bioethanol and pulping industries, in the latter case lignin can be precipitated and separated from Kraft black liquor. Furthermore, lignin has the advantage of being water soluble, thereby avoiding the need for organic solvents to dissolve the binder as required in the case of for example PVDF. Thus, lignin is much more environmental friendly than PVDF.

It has been found that a binding effect comparable to that of PVDF can be achieved and electrodes can be successfully made. Lignin can be uniformly distributed within the electrode active coating of a current collector and furthermore provides good binding strength to the current collector. Furthermore, good electrochemical performance has been observed for the electrode comprising lignin binder in a lithium-ion battery, in particular after pre-treatment of lignin to remove dissolvable fractions. Additionally, it has been found to be possible to obtain a specific capacity which is comparatively close to the theoretical specific capacity, especially after pre-treating the lignin with electrolyte. Furthermore, the electrodes function stably during repeated charge-discharge cycles without obvious reduction of the performance. It has also been found to be possible to obtain a current efficiency over 99% after a few initial cycles of charge-discharge.

The purpose of pre-treating the lignin before mixing with the other components of the composition used to coat a current collector is to remove small molecular fractions in the isolated lignin and improve the stability of the lignin in the electrolyte of the lithium-ion battery. By the pre-treatment, it is avoided that part of the lignin binder is dissolved in the electrolyte of the lithium-ion battery during use, which could reduce the electrochemical performance of the battery. The pre-treatment may suitably be performed with the purpose of reducing the amount of lignin compounds having a molecular mass below approximately 1000 Dalton.

The method for producing an electrode active coating on a current collector according to the present invention comprises providing isolated lignin and subjecting said isolated lignin to a pre-treatment in order to remove fractions dissolvable in an electrolyte of a lithium-ion battery. The pre-treated lignin has the purpose of acting as a binder in the electrode active coating. The pre-treated lignin is thereafter mixed with an electrode active material, water and optionally a conductive additive material so as obtain a slurry. The slurry is applied onto a current collector by conventional processes known to the skilled person and allowed to dry on the current collector so as to obtain the electrode active coating. Drying of the slurry on the current collector can optionally be made by forced drying.

The isolated lignin may suitably be provided from a process comprising the steps of a) precipitating lignin by acidifying black liquor obtained from the alkaline chemical pulping process;
b) dewatering and/or filtrating the obtained lignin to provide a filter cake;
c) re-suspending the lignin;
d) adjusting the pH of the obtained suspension in step c) to a pH lower than 6;
e) dewatering and/or filtrating the acidic suspension from step d) to provide a filter cake; and
f) washing and dewatering the filter cake.

Thereby a medium sized lignin (compared to native lignin) with low impurity levels with regard to carbohydrate and inorganic content can be obtained, which is highly suitable to be used as a binder in the electrode active coating especially after the pre-treatment.

The slurry may suitably comprise 5-15% by dry weight of the pre-treated lignin, preferably 6-10% by dry weight. Thereby, the desired binding properties between the particles of the coating obtained after drying as well as the desired binding propertied to the current collector are ensured.

Furthermore, the slurry may suitably comprise at least 70% by dry weight of the electrode active material, preferably at least 75% by dry weight of the electrode active material, in order to achieve the desired electrochemical properties of the coating obtained.

The remaining dry content of the slurry may according to one aspect essentially consist of a conductive additive material. It is however also possible to include additional additives as previously known in the art.

Pre-treatment of the isolated lignin is preferably made by suspending the isolated lignin in a solvent, or alternatively leaching the isolated lignin with a solvent. The solvent may preferably be a solvent which is usually contained in an electrolyte of a lithium-ion battery in which the current collector with the coating is intended to be used. Thereafter, the lignin is filtrated so as to remove the dissolved fractions of lignin, and subsequently dried. If desired, the pre-treatment may be repeated one or more times.

According to one aspect, the solvent used in the pre-treatment comprises diethyl carbonate and/or ethylene carbonate. The solvent used may essentially consist of diethyl carbonate and/or ethylene carbonate. Preferably, the solvent comprises diethyl carbonate, or essentially consists of diethyl carbonate.

The conductive additive material may be carbon or at least carbon-based. Preferably, the conductive additive material is selected from the group consisting of graphite, carbon black, acetylene black, carbon fibers and carbon nanotubes, or mixtures thereof.

The electrode active material may suitably comprise a lithium storage compound or alternatively essentially consist of a lithium storage compound. The lithium storage compound may or may not be coated with carbon as desired. Examples of suitable lithium storage compounds includes $LiCoO_2$, $LiNiO_2$, $LiMn_2O_4$, $LiNi_{1-x-y}Mn_xCo_yO_2$, $LiNiCoAl_2$, $LiNi_{0.8}Co_{0.15}Al_{0.05}O_2$, $LiNi_{1-x}Co_xO_2$, or $LiMPO_4$, wherein M is selected from the group consisting of V, Cr, Mn, Fe, Co and Ni. However, the invention is not limited to the lithium storage compounds mentioned and other lithium storage compounds are plausible. One especially suitable lithium storage compound is $LiFePO_4$.

Alternatively, the electrode active material may be selected from the group consisting of graphitic carbon (such as graphite, fullerenes, carbon nanotubes or graphene), $Li_4Ti_5O_{12}$ spinel, Sn—Co—C alloys, Sn-based materials and Si-based materials. These electrode active materials are especially suitable for use in the coating of a negative electrode.

The coating of a current collector according to the present invention comprises at least an electrode active material and a binder, wherein the binder constitutes isolated lignin that has been pre-treated with the purpose of removing fractions soluble in an electrolyte of the lithium-ion battery. The coating may preferably also contain a conductive additive. It may optionally also contain additional additives if desired.

The coating may suitably comprise 5-15% by weight of the pre-treated lignin, preferably 6-10% by weight. Thereby, the desired binding properties are ensured both between the particles of the coating as well as of the coating to the current collector.

The coating may suitably comprise at least 70% by weight of the electrode active material, preferably at least 75% by weight of the electrode active material, in order to provide the desired electrochemical properties.

The present disclosure also relates to an electrode for a lithium-ion battery comprising a current collector and an electrode active coating, as disclosed above, arranged on at least one surface of the current collector.

The present disclosure also relates to a lithium-ion battery comprising the electrode as disclosed above.

BRIEF DESCRIPTION OF DRAWINGS

FIG. 4 illustrates (a) galvanostatic charge/discharge voltage profiles, and (b) specific capacity vs. cycle number for positive electrodes comprising pre-treated lignin and which were pressed and not pressed, respectively.

FIG. 6 illustrates electrochemical properties of 80-9-11 electrode in terms of (a) the specific capacity and (b) the columbic efficiency vs. cycle number.

FIG. 11 illustrates the effect of VC addition to electrolyte on a negative electrode comprising pre-treated lignin binder where (a) shows the specific capacity and (b) shows the columbic efficiency vs. cycle number.

FIG. 12 illustrates the chromatograms collected with (a) RI and (b) UV of lignin before pre-treatment, of lignin after pre-treatment and of extract from pre-treatment.

DETAILED DESCRIPTION

In the following, the present invention will be described in more detail with reference to certain embodiments and experiments. These do however not limit the scope of the present invention and are to be considered for illustrative purposes only. The invention may be varied within the scope of the appended claims.

In the present disclosure, an electrode active material is considered to mean a material which participates in the intercalation and the deintercalation of lithium in the electrochemical cell.

Furthermore, a conductive additive material is considered to mean an additive material having the purpose of improving conductivity between particles of electrode active material in the coating as well as to the current collector.

In accordance with the present invention, isolated lignin is used as binder in an electrode active coating of current collector in a lithium-ion battery. Lignin in itself is a complex polymer occurring in certain plant walls making the plant rigid. Bonds linking lignin to cellulose are broken during a chemical pulping process. Lignin isolation from black liquor has been used during past years to provide lignin for commercial use, for example for use as a solid biofuel and dispersant. This lignin is also a valuable material for production of "green chemicals" and as a fuel for the production of chemicals. The production process of lignin of this kind is described for example in WO2006/031175. According to the process, lignin is separated from black liquor. The separation method may include steps to acidify the black liquor so that the lignin is precipitated. The solid phase is then separated from the liquor and can thereafter be cleaned and/or modified as desired.

Kraft pulping process has been found to be especially suitable for lignin separation, as disclosed e.g. by Tomani, Per; *The Lignoboost Process*; Cellulose Chem Technol., 44(1-3), 53-58 (2010). The process may result in a medium size type compared with native lignin. Furthermore, the lignin thus obtained is low in impurities in terms of carbohydrate and inorganic content. Thereby, it is especially suitable for tailored applications.

While it is preferred that the lignin used in accordance with the present invention is obtained from Kraft pulping process as disclosed above, all types of isolated lignin may be used as binder in accordance with the present invention. The isolated lignin may or may not be fractioned.

The isolated lignin is according to the present invention used as binder in an electrode active coating material of a current collector for a lithium-ion battery. As disclosed above, the lignin has the advantages of low cost and providing good binding properties to a current collector as well as between the different components, such as the electrode active material (which generally is in particulate form) and the conductive additive material, of the electrode active coating. Furthermore, the lignin as a binder provides good flexibility of the coating thereby avoiding the risk for mechanical cracks, and provides good electrochemical performance.

Lignin in general comprises molecules having a great variety of molecular mass. The molecular mass distribution depends for example of the origin of the lignin, e.g. how it has been isolated. It has now been found that this may present problems when using lignin as a binder material in an electrode active coating of a current collector. Therefore, the present invention is based on the discovery that pre-treatment of the isolated lignin can significantly improve the properties of an electrode using lignin binder.

The pre-treatment used according to the present invention is performed with the purpose of essentially removing or at least significantly reducing the amount of small fractions of lignin which are dissolvable in an electrolyte of a lithium ion battery. In case such fractions are not removed before use of the lithium-ion battery, they will be dissolved in the electrolyte during use of the lithium-ion battery which in turn may negatively affect the performance. The reason for the negative effect is that dissolved fractions of binder in the electrolyte could risk reducing the electrical performance by causing side reactions, deteriorate materials like the electrolyte, the electrodes and the possible separator, lower the energy efficiency and shorten the life time of the lithium-ion battery.

The pre-treatment is according to one aspect performed by suspending or leaching the isolated lignin in a solvent in order to remove soluble low molecular mass compounds, in particular lignin compounds having a molecular mass below approximately 1000 Dalton. The solvent may suitably be a solvent adapted to be used in an electrolyte of a lithium-ion battery and any solvent adapted for said use may be used during the pre-treatment of the lignin. For example, the solvent may suitably comprise cyclic or linear carbonates. Preferably, the solvent comprises diethyl carbonate and/or ethylene carbonate. The solvent may essentially consist of diethyl carbonate and/or ethylene carbonate. According to one exemplifying embodiment, the solvent comprises at least 95 wt.-%, preferably at least 98 wt.-%, diethyl carbonate.

Figure 1:
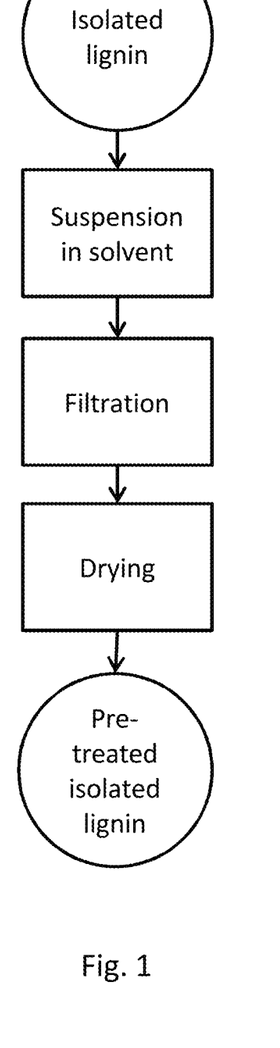
FIG. 1 illustrates a flow chart of a pre-treatment of lignin according to one aspect of the invention.

FIG. 1 illustrates a flow chart of one exemplifying embodiment of how to perform the pre-treatment to remove the small fractions of lignin. As shown in the figure, isolated lignin is suspended in a suitable solvent. Suspension of the lignin may suitably be performed in a stirrer or the like. The suspension is thereafter filtered through a filter with a suitable mesh and the resulting filter cake is thereafter allowed to dry, preferably at a temperature of at least 50° C.

The pre-treatment is performed before the lignin is mixed with the other components of the electrode active coating composition in order to minimize the risk that dissolvable fractions of the lignin remain in the coating composition. Performing the pre-treatment of lignin before it is mixed with the other components of the electrode active coating composition also has the advantage that it is easier to leach out the dissolvable fractions compared to a case where the coating as such would be subjected to a pre-treatment in an electrolyte before assembly of the battery cell. Furthermore, if the coating as such would be subjected to a pretreatment to remove dissolvable fractions of the lignin, there might be a risk of increased porosity in the coating. Thus, the pre-treatment of lignin should be performed before mixing with the other components of the electrode active coating composition.

The isolated lignin, which should subsequently be subjected to the pre-treatment, can suitably be obtained from a process comprising the steps of:
a) precipitating lignin by acidifying black liquor obtained from the alkaline chemical pulping process;
b) dewatering and/or filtrating the obtained lignin to provide a filter cake;
c) re-suspending the lignin;
d) adjusting the pH of the obtained suspension in step c) to a pH lower than 6;
e) dewatering and/or filtrating the acidic suspension from step d) to provide a filter cake; and
f) washing and dewatering the filter cake.

Preferably, pH in step d) is adjusted to be lower than 4, such as equal with or lower than 3.5, e.g. 2-2.5, so that as much lignin as possible is re-suspended and thus a high yield and good filtration properties in the following filtration operations e) and f) can be obtained.

Prior to the step a), the process may comprise a pre-step in which black liquor is fractionated by filtration by for example membrane filtration such as micro- and ultra-filtration. By the mechanical separation it is possible to separate for example particulate material, hemicelluloses and/or it is possible to mechanically fractionate lignin and to obtain a specific fraction of lignin. In this way it is possible to obtain at least partially purified starting material and/or lignin fraction while high yield can be obtained since lignin is not substantially chemically affected. Another way to achieve fractions of lignin is a fractionation by means of different pH levels and select lignins from a certain pH-window for further processing.

In order to achieve a slurry which may be used to coat a current collector to achieve an electrode active coating thereon, the pre-treated isolated lignin is mixed with an electrode active compound, preferably a conductive additive material, and water so as to achieve the slurry. The slurry may also comprise additional additives if desired, for example for adjustment of viscosity or for improving the flexibility of the lignin. One example of an additional additive is polyethylene glycol dissolved in acetone which may be added to the slurry to improve the flexibility of the lignin.

The electrode active material may be any electrode active material previously used in electrodes for lithium-ion batteries. For example, the electrode active compound may in the case of a positive electrode be a lithium storage compound selected from the group consisting of $LiCoO_2$, $LiNiO_2$, $LiMn_2O_4$, $LiNi_{1-x-y}Mn_xCo_yO_2$ (NMC), $LiNiCoAl_2$, $LiNi_{0.8}Co_{0.15}Al_{0.05}O_2$(NCA), $LiNi_{1-x}Co_xO_2$, or $LiMPO_4$, wherein M is selected from the group consisting of V, Cr, Mn, Fe, Co and Ni. According to one aspect, the electrode active compound is $LiFePO_4$ coated with carbon (optionally in the form of graphite). In case of a negative electrode, the electrode active compound may for example be selected from the group consisting of graphitic carbon (in addition to graphite also including fullerenes, carbon nanotubes, and graphene), $Li_4Ti_5O_{12}$ spinel (LTO), Sn—Co—C alloys, Sn-based materials and Si-based materials.

The conductive additive material may suitably be carbon or at least carbon-based. Examples of suitable conductive additive materials are graphite, carbon black, acetylene black, carbon fibers or carbon nanotubes.

It may be recognized from the disclosure above that the electrode active coating, as well as the slurry for producing such a coating, may comprise an electrode active material and a conductive additive of essentially the same type, for example carbon or carbon-based materials. In such a case, they may however be of different types, for example having different crystallinity or crystal form, particle sizes, different surface areas, different conductivities or the like, such that one acts essentially as the electrode active material whereas the other acts essentially as the conductive additive. Such alternatives are well known in the art and will therefore not be discussed further in the present disclosure.

According to one aspect of the present invention, the electrode active coating is produced without pressing of the coating after it has been dried. While pressing may reduce the porosity of the electrode active coating, it has been found that it may result in deteriorated electrochemical performance. This is believed to be caused by the pressing affecting the inter-particle contact between the electrode active material and the conductive additive material. Therefore, pressing is suitably avoided. This also reduces the production steps and hence the cost of the electrodes.

EXPERIMENTAL RESULTS

Materials

The materials used in the experimental test were carbon coated $LiFePO_4$ powder (below referred to as $LiFePO_4$) with a particle size of 100-300 nm provided by Phostech Lithium, Super-P carbon having a particle size of about 40 nm obtained from Timcal, lignin prepared by means of the LignoBoost® process was provided from Innventia AB, and polyethylene glycol provided by Merck kGaA. Dried acetone >99.9% was provided by Merck KGaA. Graphite of the type Timrex SLP 30 AH-354 with a particle size of about 32 μm was provided by Timcal Graphite & Carbon. Diethyl carbonate (DEC) >99.9% for the pre-treatment of lignin was provided by Alfa Aesar. All of the water used was deionized water.

The electrolyte consisting of 1 M LiPF6 salt in ethylene carbonate (EC):diethyl carbonate (DEC) 1:1 by weight was obtained from Merck KGaA.

Pre-Treatment of Lignin

Pre-treatment of the lignin in order to remove small dissolvable fractions of the lignin was performed by mixing lignin in the DEC by magnetic stirrer at least overnight. Then, the suspension was vacuum filtered through a Durapore membrane filter, type 2.22 μm GV, supplied by Millipore. The powder obtained was dried at 60° C. for 12 hours.

Preparation of LiFePO$_4$ Positive Electrodes

LiFePO$_4$, Super-P-carbon and lignin with 5% PEG (based on dry weight of lignin) dissolved in acetone with the addition of approximately 10 wt.-% water were used to prepare electrodes slurries. The purpose of the addition of PEG is to make the lignin more flexible. The PEG dissolved in acetone was introduced by addition to the slurry. The ratio of the components to make slurries was adjusted to not only improve adhesion of the particles to the current collector, but also ensure good electrochemical properties. The slurries were thoroughly mixed by magnetic stirrer at 500 rpm at least overnight. The electrodes were assembled by the following processing. A 25 µm Al foil was put on the top of Elcometer 4340 Automatic film Applicator. The slurries spread on the Al foil by a doctor-blade with a 50 µm gap to produce electrode films. Then the films were dried at 110° C. for one day under vacuum to remove water properly. The electrodes were stored in the glove box filled with Argon gas.

Some of the electrodes were pressed whereas others were not pressed. Where not specifically given as pressed, the tests given below were performed on non-pressed electrodes. When pressing was performed, the electrode films were pressed between two flat plates at room temperature under 22.5 MPa using Laboratory Press obtained from Fontune Presses.

Preparation of Graphite Negative Electrodes

The negative electrodes were prepared by the similar processing with the positive electrodes. 94 wt. % Graphite, 2 wt. % Super-P-carbon and 8 wt. % lignin with 5% PEG (based on dry weight of lignin) dissolved in acetone with the addition of approximately 10 wt.-% water were used to prepare negative electrodes slurries. The slurries were thoroughly mixed by magnetic stirrer at 500 rpm at least overnight. The current collector used for negative electrodes is 20 µm Cu foil. The slurries spread on the Cu foil by a doctor-blade with a 50 µm gap to produce electrode films using the Elcometer 4340 Automatic film Applicator. Then the films were dried at 110° C. for one day under vacuum to remove water properly. The electrodes were stored in the glove box under Argon gas.

Characterization

The electrode films were studied by a Hitachi S-4800 field emission SEM. The half-cells were built by both positive and negative electrodes versus Li metal with the electrolyte. The electrochemical performance of the cells was carried out by Gamry PCI4 G750 potentiostat. Charge and discharge cycling of the cells were measured between the voltage limits of 2.8 V~4 V vs. Li$^+$/Li° for the positive electrodes and 0.002 V~1.5 V vs. Li$^+$/Li° for the negative electrodes at room temperature unless otherwise explicitly stated.

Geometry

The porosity of LiFePO$_4$ cathode based on lignin as a binder material ((p) was estimated using the measured volume (V$_1$) and the theoretical volume of the electrode (V$_2$).

$$\varphi = 1 - \frac{V_2}{V_1} \quad (1)$$

$$V_2 = r^2 * \pi * t \quad (2)$$

$$V_1 = \frac{m_{LFP}}{\rho_{LFP}} + \frac{m_c}{\rho_c} + \frac{m_{lignin}}{\rho_{lignin}} \quad (3)$$

where t is the electrode thickness, r is the radius of electrode, $\rho_{LFP}$, $\rho_c$ and $\rho_{lignin}$ are LiFePO$_4$, Super P Carbon and lignin densities and $m_{LFP}$, $m_c$ and $m_{lignin}$ are the weight of LiFePO$_4$, Super P Carbon and lignin in the electrode.

Experimental Test 1

Figure 2A:
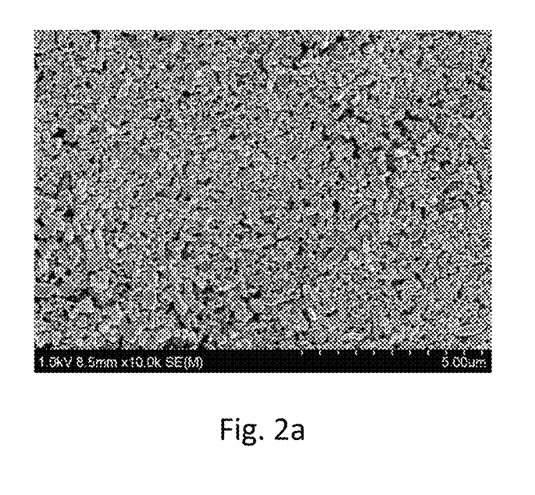
FIGS. 2a and 2b illustrate Scanning Electron Microscopy (SEM) images of a surface of a positive electrode comprising pre-treated lignin binder at different magnifications.
Figure 2B:
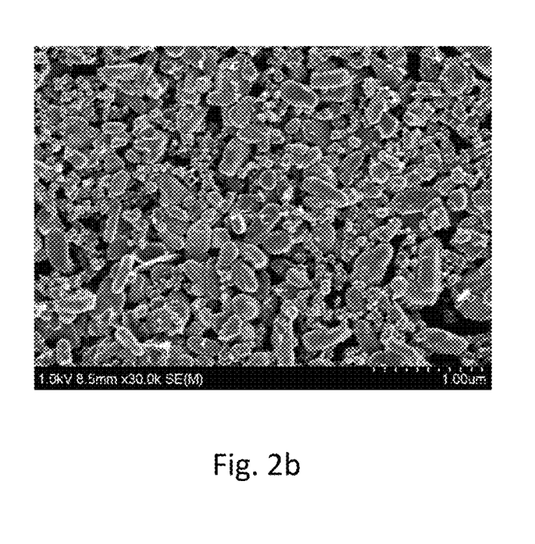

FIGS. 2a and 2b show SEM images of the surface of a LiFePO$_4$ cathode prepared with a pre-treated lignin binder. The composition of the sample shown in the images was 80 wt.-% LiFePO$_4$, 11 wt-% Super P carbon and 9 wt.-% lignin (all percentages by dry weight). In FIG. 2a, the distance marks on the lower right hand side each indicates a distance of 5 µm, whereas in FIG. 2b, the distance marks indicate a distance of 1 µm. It can be seen that LiFePO$_4$ and Super P carbon were very uniformly dispersed with lignin by the procedure described above.

The electrode densities were from 1.15 g cm$^{-3}$ to 1.2 g cm$^{-3}$ for different electrodes (having different compositions). The lowest density was achieved for the composition with 80 wt.-% LiFePO$_4$, 11-wt-% Super P carbon and 9 wt.-% lignin, whereas the highest density was obtained for the composition of 84 wt.-% LiFePO$_4$, 7 wt.-% Super P carbon and 5 wt.-% lignin. The thickness of the coating obtained after evaporation of the slurries was approximately 14 µm. Furthermore, it was found that lignin is enough to ensure good binding for making LiFePO$_4$ cathode for Li ion batteries.

Experimental Test 2

Positive electrodes with 82 wt.-% LiFePO$_4$, 9% Super P carbon and 9% pre-treated and non-pre-treated, respectively, isolated lignin were each cycled against a Li electrode between 2.5 and 3.8 V at the rate C/10. The electrodes contained 0.94 mg/cm$^2$ of electrode active material.

Figure 3:
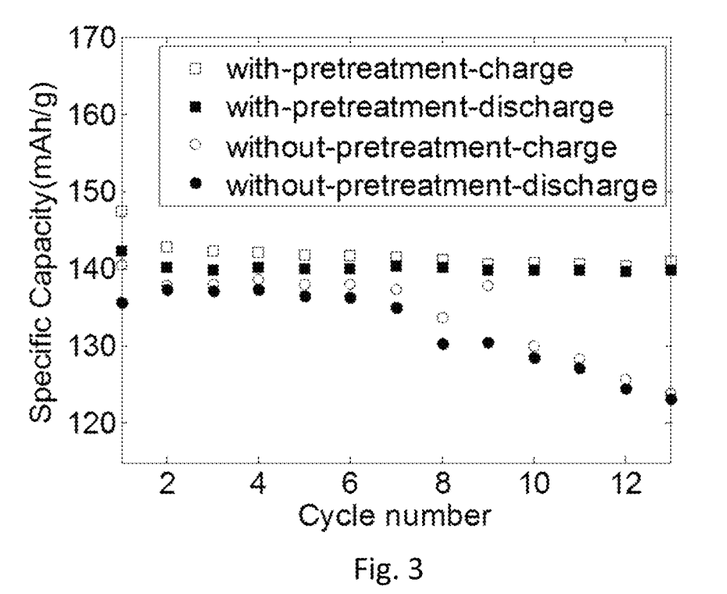
FIG. 3 illustrates the specific capacity vs. the cycle number for positive electrodes comprising pre-treated and non-pretreated lignin, respectively.

The results are shown in FIG. 3. It can be clearly seen that a specific capacity as high as about 140 mAh/g was obtained for the electrode with pre-treated lignin, which can be compared to the theoretical value of 170 mAh/g. The electrode functioned stably during repeated charge-discharge cycles without obvious reduction of performance. In the case of the electrode with the non-pre-treated lignin, the specific capacity dramatically decreased after 5 cycles as shown in FIG. 3. Therefore, pre-treatment is very important for making the electrode with lignin as binder.

Experimental Test 3

Figure 4A:
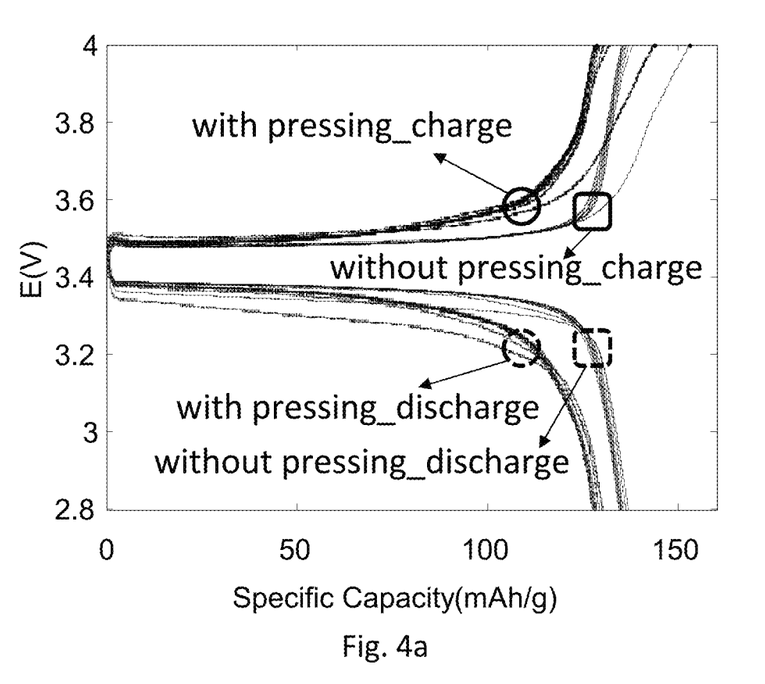
Figure 4B:
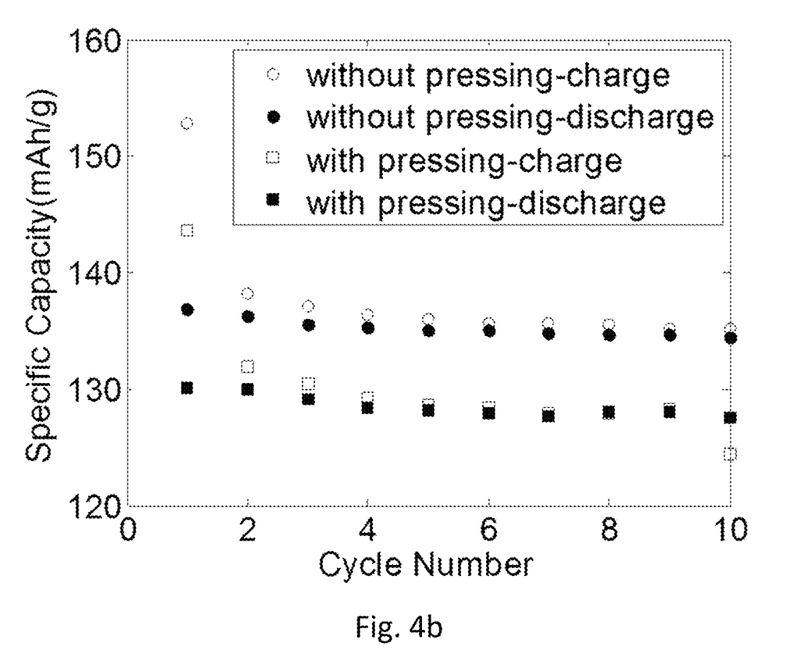

The porosity of the LiFePO$_4$ positive electrodes that were not pressed is about 52% (irrespective of composition) with assuming $\rho_{lignin}$ is 1.5 g cm$^{-3}$. Compared with the common commercial positive electrodes (about 30%), the porosity of the electrodes without pressing is relatively high. In order to decrease the porosity of the electrode, the properties of the LiFePO$_4$ positive electrodes with pressing were investigated. After pressing according to the process described above, the porosity of the electrodes is slightly decreased to about 48%. The electrochemical performance of the LiFePO$_4$ positive electrodes with pressing and without pressing were tested at C/10 rate at room temperature. The results are shown in FIG. 4a showing the galvanostatic charge/discharge voltage profiles and FIG. 4b showing the specific capacity versus cycle numbers.

The data show clearly a difference both in the voltage profile and in specific capacity before and after pressing; a high polarization and a significant decrease of specific capacity from 135 mAh/g to 125 mAh/g after 10 cycles were observed after pressing, which could be attributed to the poor inter-particle contact between the LiFePO$_4$ and Super P carbon with pressing.

It was also found that charge transfer resistance of the electrode with pressing was higher than that without pressing, which cause the electrochemical performance to decrease. It illustrates that LiFePO$_4$ positive electrodes using lignin as a binder without pressing is enough to have a good binding and adhesive with the current collector for Li ion batteries, which could make the processing of electrodes more easily.

Experimental Test 4

The amount of Super P carbon as a conductive material additive and lignin as a binder material used in the electrode could influence the electrochemical performance for Li-ion batteries and should therefore be optimized. Therefore, different compositions were tested. For convenience, an abbreviated form is used to describe the formulation of each component in the electrode. For instance, 82-9-9 indicates that the components of the electrode consisted of 82 wt.-% LiFePO$_4$, 9 wt.-% Super P carbon and 9 wt.-% lignin (all percentages by dry weight).

Figure 5:
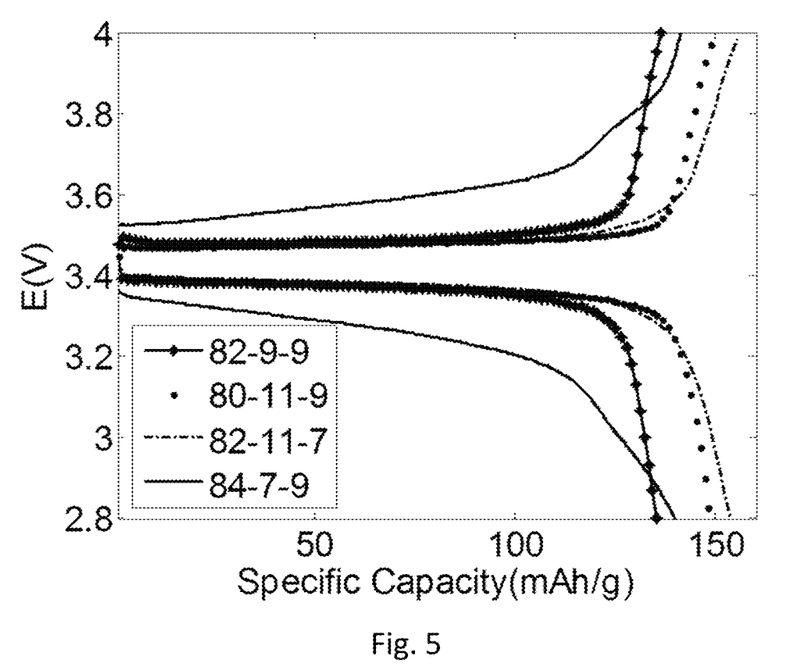
FIG. 5 illustrates voltage profiles in the 4$^{th}$ cycle for positive electrodes comprising pre-treated lignin vs. Li at C/10 at room temperature, the electrodes having different compositions.

FIG. 5 shows the voltage profiles for 84-7-9, 82-9-9, 80-11-9, 82-11-7 and 84-11-5 LiFePO$_4$ positive electrodes with different percentages of Super P carbon and lignin in the 4$^{th}$ cycle of the positive electrodes versus Li at C/10 at room temperature. All of electrodes show relatively good properties and can be used for Li ion batteries. 84-7-9 electrode with lowest amount of Super P carbon shows a higher polarization than the other electrodes, which is ascribed to poor electrical conductivity between the active particles using less conductive material. The electrochemical performance can be improved by increasing the amount of Super P carbon. Comparing 82-9-9 and 80-11-9 electrodes, the former one shows a slightly higher polarization and lower specific capacity and the latter performs better overall. In order to improve the energy density, decreased lignin was considered. When the percentage of lignin declines to be 5 wt. %, the specific capacity drops dramatically to approximately 135 mAh/g, probably due to poor adhesion to the current collector. 80-11-9 and 82-11-7 show quite similar performance as regards both voltage profiles and specific capacities, however, the more lignin used in the electrode the better adhesion could be achieved. Thus, 80-11-9 electrode may be considered to be the optimization LiFePO$_4$ positive electrodes with lignin binder.

Experimental Test 5

Figure 6A:
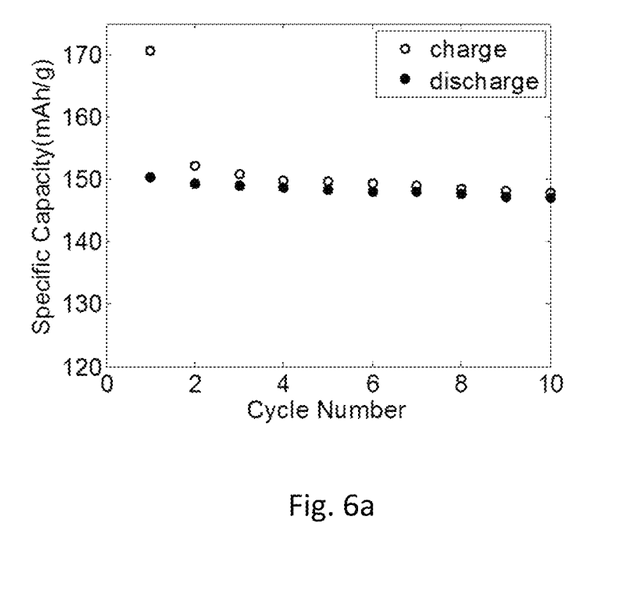
Figure 6B:
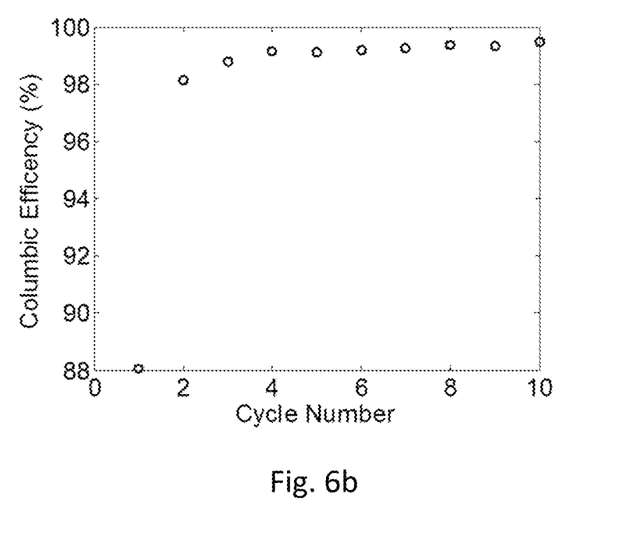

The electrochemical properties of a 80-11-9 electrode, i.e. 80 wt.-% LiFePO4, 11 wt.-% Super P carbon and 9 wt.-% isolated pre-treated lignin, was tested. The result is shown in FIGS. 6a and 6b. The figures show the first ten cycles of specific capacity and columbic efficiency cycled at C/10 at room temperature. The columbic efficiency (ratio discharge/charge) for the first cycle shows a value of 88% using lignin binder. After three cycles, the columbic efficiency was about 99% and maintained stable in subsequent cycles. Relatively high reversible capacity was obtained with lignin binder (about 148 mAh/g), which is not far away to the theoretical capacity of lithium iron phosphate of 170 mAh/g. The capacity is almost maintained constant after first cycle. This result confirms that lignin can keep a good inter-particle contact between LiFePO$_4$ and Super P carbon as well as providing a sufficient adhesion of the coating to the current collector.

Figure 7:
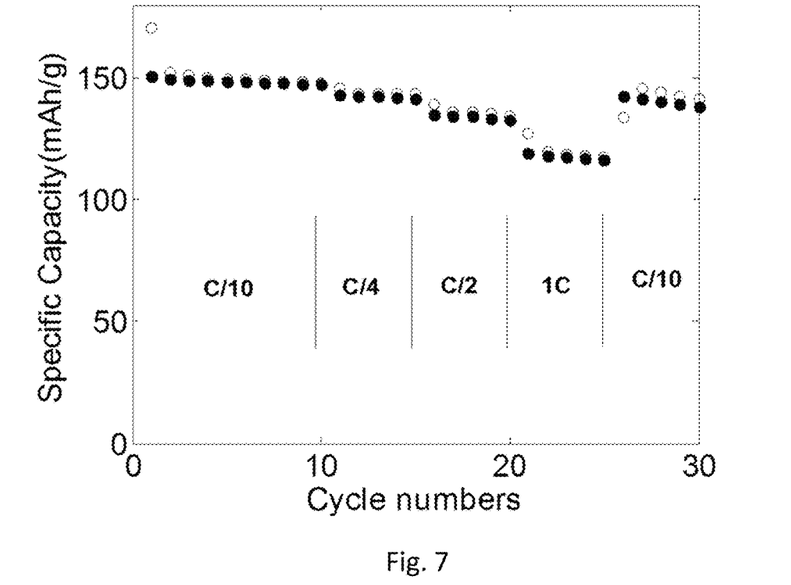
FIG. 7 illustrates rate capabilities of 80-11-9 electrode vs. a Li metal electrode.

The rate capabilities (versus a Li metal electrode) evaluation was performed on the 80-11-9 electrode, and the result is shown in FIG. 7. From C/10 to C/4 rate, the capacity was slightly decreased from 148 mAh/g to 142 mAh/g, which is attributed to high polarization caused by increasing current density. After 15 cycles, the 80-11-9 electrode still shows a good electrochemical performance at C/2 with 134 mAh/g which delivers above 90% of the capacity at C/10. At high rate 1 C, the electrode still retains an acceptable capacity of 117 mAh/g, which represents approximately 80% of the capacity at C/10. After 25 cycles, the current rate goes back to C/10 and the capacity is quite similar to the capacity at C/10 for the first ten cycles which remains above 98%. That is, the LiFePO$_4$ positive electrodes with pre-treated lignin binder show excellent rate capabilities.

Experimental Test 6

Figure 8A:
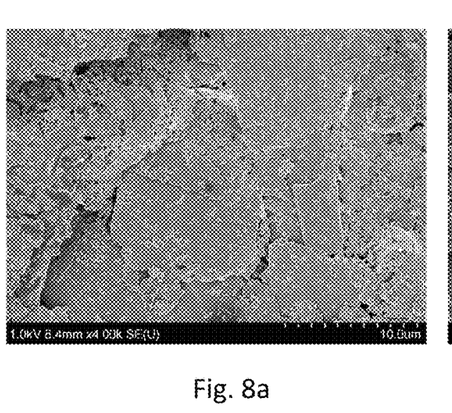
FIGS. 8a and 8b illustrate Scanning Electron Microscopy (SEM) images of a surface of a negative electrode comprising pre-treated lignin binder at different magnifications.
Figure 8B:
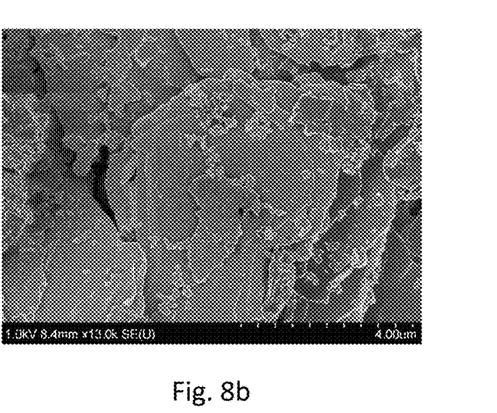

FIGS. 8a and 8b show SEM images of the surface of a graphite negative electrode prepared with a pre-treated lignin binder. The composition of the sample shown in the images was 90 wt.-% graphite, 2 wt.-% Super P carbon and 8 wt.-% lignin (percentages by dry weight). In FIG. 8a, the distance marks on the lower right hand side each indicates a distance of 10 μm, whereas in FIG. 8b, the distance marks indicate a distance of 4 μm. The morphology of the graphite negative electrode film shows that graphite and Super P carbon particles were uniformly dispersed by the lignin binder.

Figure 9:
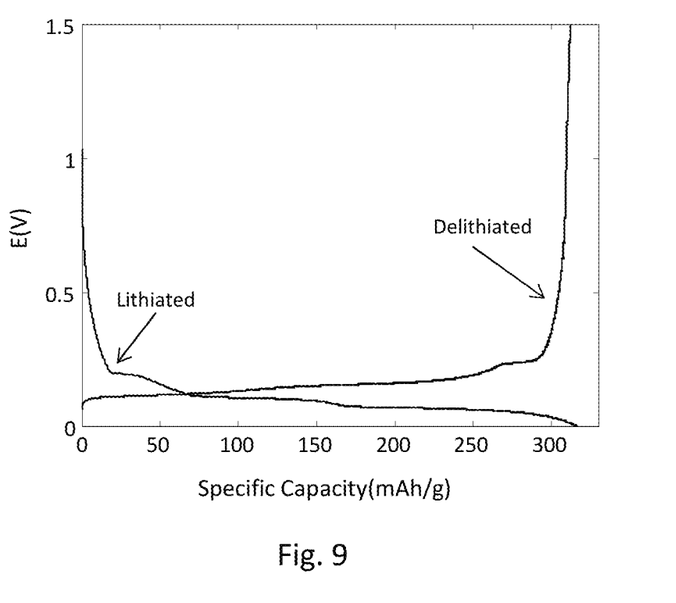
FIG. 9 illustrates galvanostatics charge/discharge voltage profiles of a negative electrode using pre-treated lignin binder at C/10 rate in 4$^{th}$ cycles.

Galvanostatic charge/discharge voltage profile was investigated for the graphite negative electrode. FIG. 9 illustrates the 4$^{th}$ cycle of charge/discharge voltage profile of the graphite negative electrode cycled against Li at room temperature at C/10 rate. It shows that lithium can intercalate and deintercalate into graphite with several distinct voltage plateaus according to different stages of lithium over one cycle. Lignin is a stable material and, when pre-treated to remove small molecular mass fractions, has no effect on lithium intercalation and deintercalation. This result illustrates that lignin can be a potential binder material for graphite negative electrode in Li-ion batteries.

Figure 10:
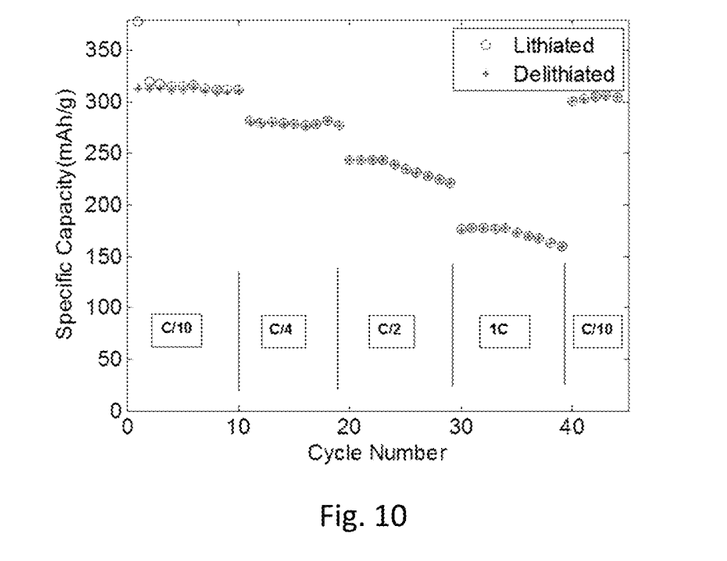
FIG. 10 illustrates rate capabilities of a negative electrode comprising pre-treated lignin binder.

Furthermore, the rate capabilities for the graphite negative electrode were investigated and the result is shown in FIG. 10. It can be seen that the electrode has good rate capabilities. First 10 cycles at C/10, the reversible specific capacities were around 305 mAh/g which is relatively close to the theoretical capacity of graphite. From rate C/10 to C/4, stable specific capacities of about 280 mAh/g were obtained, which is slightly decreased caused by high resistance with high current and limitations in the Li ions diffusion. Further 10 cycles at C/2 rate obtaining a specific capacity of 220 mAh/g. Even at high C rate of 1 C, the electrode still keeps an acceptable specific capacity of over 160 mAh/g. After 40 cycles at different current rates, the electrode was tested at rate of C/10 again and achieved a stable specific capacities which is similar with the first 10 cycles at C/10.

Experimental Test 7

Figure 11A:
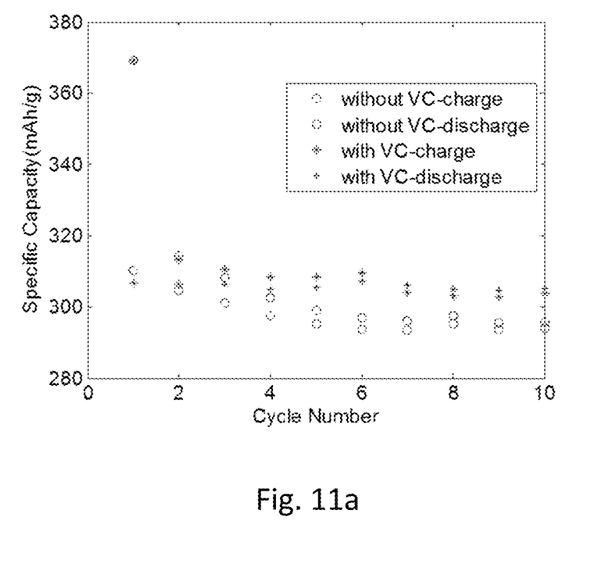
Figure 11B:
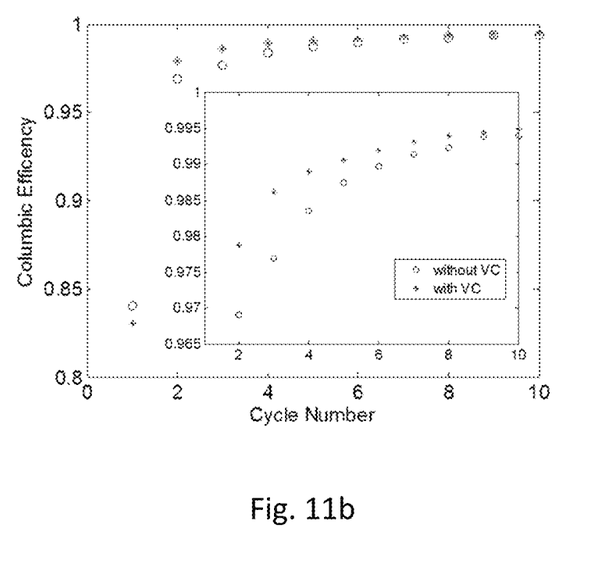

Tests were performed by addition of vinylene carbonate (VC) as an additive to the electrolyte. The effect of the VC addition is shown in FIG. 11 from which it is clear that the addition can dramatically improve the electrochemical performance of the graphite negative electrode with the binder of lignin. The observed irreversible capacities of the first cycles are attribute to form the solid electrolyte interface (SEI). The reversible capacities of the electrodes containing VC during the first cycle are slightly lower than that VC free. However, the discharge capacity of electrodes with VC maintains a stable value of about 305 mAh/g in the subsequent cycles and keeps more than 99% of retention after 10 cycles. The capacities of the electrodes without VC decrease gradually caused capacity fading problem. After first cycles, the CE of the electrodes containing VC is overall higher than that without VC as shown in the inset of FIG. 11 (b). It illustrates that high cycle stability can be obtained by using VC as additive in electrolyte solution.

Experimental Test 8

In order to remove the small molecule parts in the lignin, lignin provided by Innventia AB which had been isolated from Kraft black liquor was mixed in Diethyl carbonate (DEC) by magnetic stirrer at 500 rpm overnight. Then, the suspension was vacuum filtered through a Durapore membrane filter, type 2.22 µm GV, supplied by Millipore. The process was repeated several times until no lignin could be dissolved in the DEC. The powder was dried at 60° C. for 12 hours.

The result showed that approximately 7% by weight of the original lignin can dissolve in DEC. The extract, extracted and original lignin was used for further analysis of molar mass distribution (MMD). Prior to analysis, the samples were derivatized by acetylation using acetic anhydride. The MMD was determined by size exclusion chromatography (SEC) using tetrahydrofuran (THF) as the mobile phase. The SEC system consists of three columns, Styragel HR1, Styragel HR2 and Styragel HR4, connected in series. The detection was performed using refractive index detector (Waters 2414) and UV detector (Knauer). The UV absorbance was measured at 280 nm.

Figure 12A:
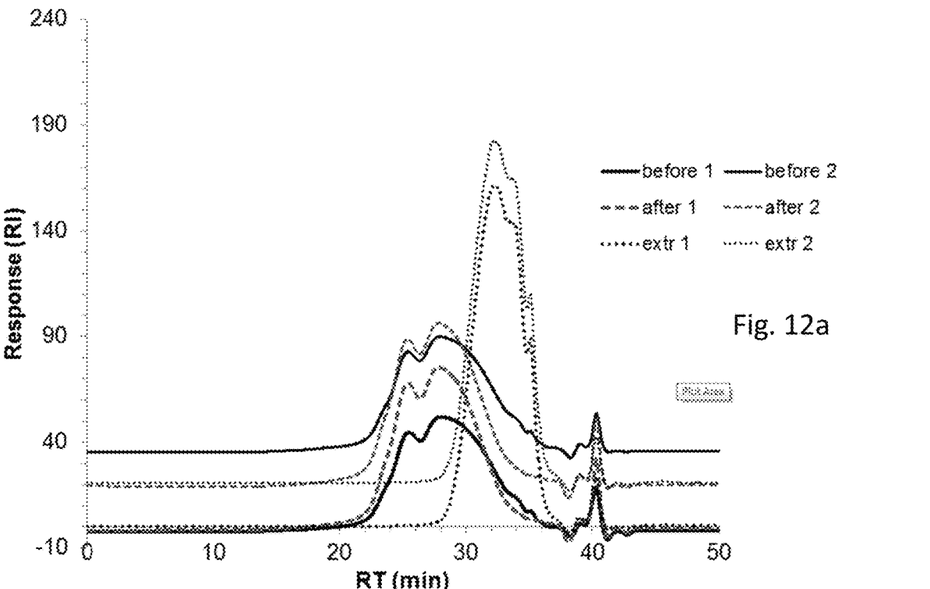
Figure 12B:
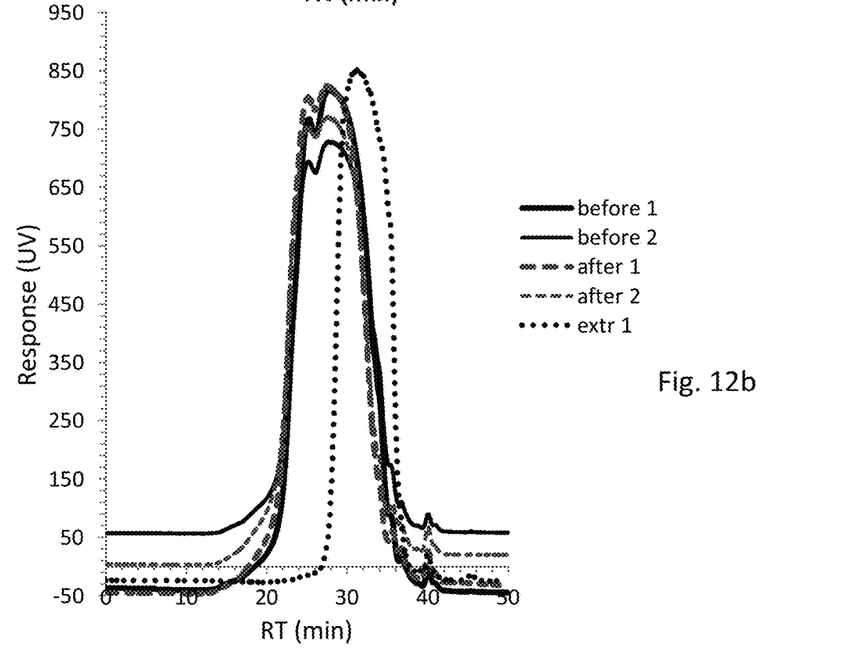
Figure 13:
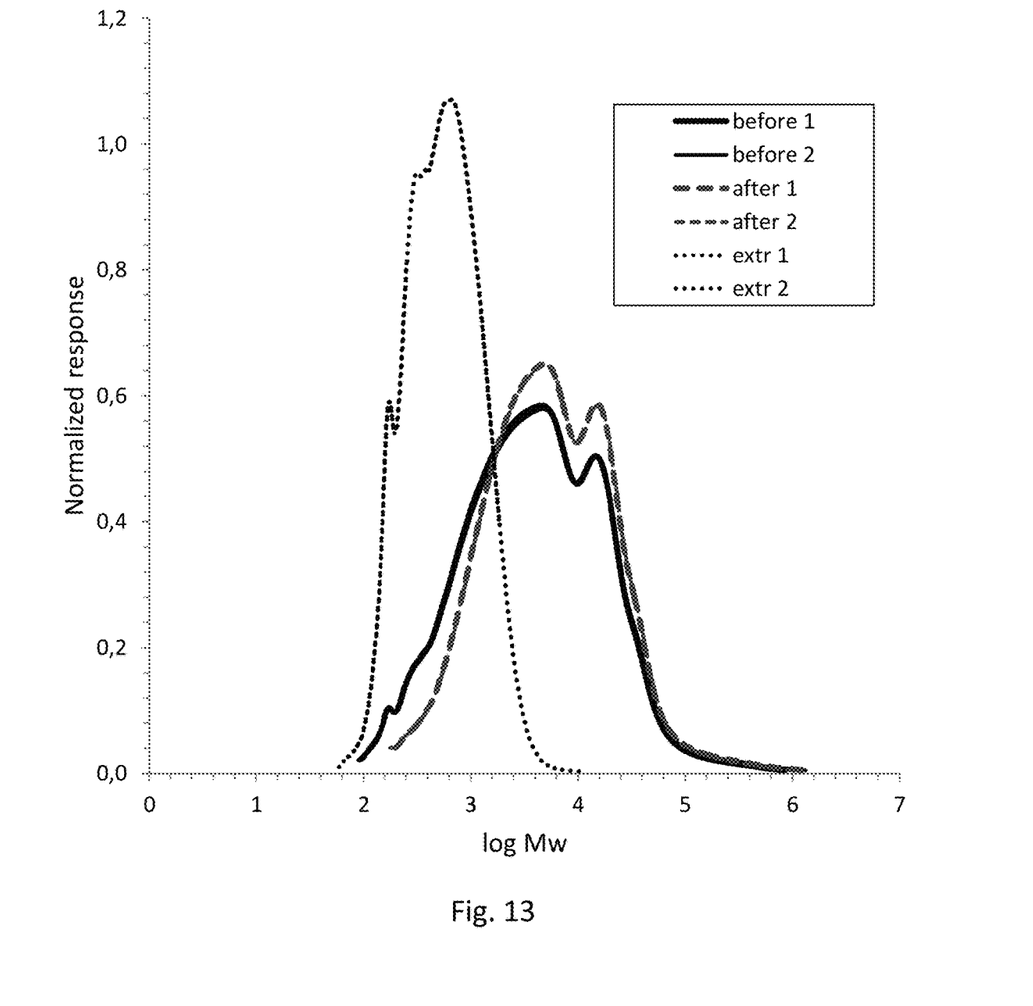
FIG. 13 illustrates molecular weight distribution of lignin before pre-treatment, of lignin after pre-treatment and of extract from pre-treatment.

The SEC system was calibrated using polystyrene standards. The samples were dissolved in THF (approximately 5 mg/ml) and filtered (PTFE syringe filter, 0.20 µm). Duplicate samples were analyzed. The molar mass distribution (MMD) was calculated from the RI signal. From the MMD the weight average molar mass (Mw), the number average molar mass (Mn) and the polydispersity (PD) index (Mw/Mn) were determined. The results are shown in Table 1. FIG. 12 illustrates the chromatograms collected with RI (a) and UV detectors (b), and FIG. 13 illustrates the molecular weight distribution for the three samples.

TABLE 1

| Sample | Mw | Mn | PD |
| --- | --- | --- | --- |
| Before pre-treatment | 14000 | 1400 | 9.9 |
| After pre-treatment | 16000 | 2400 | 6.8 |
| Extract | 700 | 400 | 1.8 |

What is claimed is:

1. A method of producing an electrode active coating on a current collector for a lithium-ion battery, the method comprising:
    providing isolated lignin with the purpose of acting as a binder and subjecting said isolated lignin to a pre-treatment in order to remove fractions dissolvable in an electrolyte of a lithium-ion battery, said fractions having a molecular mass below 1000 Dalton;
    mixing the pre-treated isolated lignin with an electrode active material, water and optionally a conductive additive material so as obtain a slurry;
    applying said slurry onto a current collector; and
    allowing the slurry to dry onto the current collector so as to obtain the electrode active coating.

2. The method according to claim 1, wherein the isolated lignin is provided from a process comprising the steps of:
    a) precipitating lignin by acidifying black liquor obtained from the alkaline chemical pulping process;
    b) dewatering and/or filtrating the obtained lignin to provide a filter cake;
    c) re-suspending the lignin;
    d) adjusting the pH of the obtained suspension in step c) to a pH lower than 6;
    e) dewatering and/or filtrating the acidic suspension from step d) to provide a filter cake; and
    f) washing and dewatering the filter cake.

3. The method according to claim 1, wherein the slurry comprises 5-15% by dry weight of pre-treated isolated lignin, preferably 6-10% by dry weight.

4. The method according to claim 1, wherein the slurry comprises at least 70% by dry weight of the electrode active material, preferably at least 75% by dry weight of the electrode active material.

5. The method according to claim 1, wherein the isolated lignin is pre-treated by suspending the isolated lignin in or leaching the isolated lignin with a solvent, preferably a solvent adapted for use in an electrolyte of a lithium-ion battery, followed by filtration and drying.

6. The method according to claim 5, wherein the solvent comprises diethyl carbonate and/or ethylene carbonate.

7. The method according to claim 1, wherein the conductive additive material is carbon or carbon-based, preferably selected from the group consisting of graphite, carbon black, acetylene black, carbon fibers and carbon nanotubes, or mixtures thereof.

8. The method according to claim 1, wherein the electrode active material comprises or is a lithium storage compound.

9. The method according to claim 8, wherein the lithium storage compound is selected from the group consisting of $LiCoO_2$, $LiNiO_2$, $LiMn_2O_4$, $LiNi_{1-x-y}Mn_xCo_yO_2$, $LiNiCoAl_2$, $LiNi_{0.8}Co_{0.15}Al_{0.05}O_2$, $LiNi_{1-x}Co_xO_2$, or $LiMPO_4$, wherein M is selected from the group consisting of V, Cr, Mn, Fe, Co and Ni.

10. The method according to claim 8, wherein the lithium storage compound is coated with carbon.

11. The method according to claim 1, wherein the electrode active material is selected from the group consisting of graphitic carbon, $Li_4Ti_5O_{12}$ spinel, Sn—Co—C alloys, Sn-based materials and Si-based materials.

12. A coating for a current collector for a lithium-ion battery, the coating comprising at least an electrode active material, a binder and optionally a conductive additive material, wherein the binder constitutes isolated lignin that has been pre-treated with the purpose of removing fractions soluble in an electrolyte of the lithium-ion battery, said fractions having a molecular mass below 1000 Dalton.

13. The coating according to claim 12, comprising 5-15% by weight of pre-treated isolated lignin, preferably 6-10% by weight of pre-treated isolated lignin.

14. The coating according to claim 12, comprising at least 70% by weight of the electrode active material, preferably at least 75% by weight of the electrode active material.

15. The coating according to claim 12, wherein the lignin has been pre-treated by suspending the isolated lignin in a solvent or leaching the isolated lignin with a solvent, followed by filtration and drying of the isolated lignin.

16. The coating according to claim 12, wherein the conductive additive material is carbon or carbon-based, preferably selected from the group consisting of graphite, carbon black, acetylene black, carbon fibers and carbon nanotubes, or mixtures thereof.

17. The coating according to claim 12, wherein the electrode active material comprises or is a lithium storage compound.

18. The coating according to claim 17, wherein the lithium storage compound is selected from the group consisting of $LiCoO_2$, $LiNiO_2$, $LiMn_2O_4$, $LiNi_{1-x-y}Mn_xCo_yO_2$, $LiNiCoAl_2$, $LiNi_{0.8}Co_{0.15}Al_{0.05}O_2$, $LiNi_{1-x}Co_xO_2$, or $LiMPO_4$, wherein M is selected from the group consisting of V, Cr, Mn, Fe, Co and Ni.

19. The coating according to claim 17, wherein the lithium storage compound is coated with carbon.

20. The coating according to claim 12, wherein the electrode active material is selected from the group consisting of graphitic carbon, $Li_4Ti_5O_{12}$ spinel, Sn—Co—C alloys, Sn-based materials and Si-based materials.

21. An electrode for a lithium-ion battery comprising a current collector provided with the coating according to claim 12.

22. An lithium-ion battery comprising an electrode according to claim 21.

* * * * *